United States Patent [19]

Harris

[11] 4,000,420

[45] Dec. 28, 1976

[54] METHOD AND APPARATUS FOR SEPARATING ISOTOPES

[75] Inventor: Stephen E. Harris, Palo Alto, Calif.

[73] Assignee: The Board of Trustees of Leland Stanford Junior University, Stanford, Calif.

[22] Filed: June 11, 1974

[21] Appl. No.: 478,312

[52] U.S. Cl. .............................. 250/281; 250/282; 250/423 P; 250/424

[51] Int. Cl.² ........................................ H01J 39/34

[58] Field of Search .......... 250/281, 282, 423, 424, 250/288

[56] References Cited

UNITED STATES PATENTS

| 3,294,970 | 12/1966 | Jenckel | 250/423 |
| 3,443,087 | 5/1969 | Robieux | 250/290 |
| 3,478,204 | 11/1969 | Brubaker et al. | 250/423 |
| 3,772,519 | 11/1973 | Levy et al. | 250/425 |

OTHER PUBLICATIONS

"Plasma Ionization Enhancement by Laser Line Radiation," Oettinger et al., AIAA Journ. vol. 8, No. 5, May 1970, pp. 880–885.

Primary Examiner—James W. Lawrence
Assistant Examiner—B. C. Anderson
Attorney, Agent, or Firm—Flehr, Hohbach, Test, Albritton & Herbert

[57] ABSTRACT

Isotope separation is achieved between species A and B having an absorption resonance separated by an isotopic shift by selectively exciting a portion of species A using a tunable photon source of narrow emission line with and subsequently causing collisions with an optically excited third species to selectively ionize the excited portion of species A. When ionized, species A is easily separated by any technique, using its ionized condition to distinguish it from species B.

18 Claims, 3 Drawing Figures

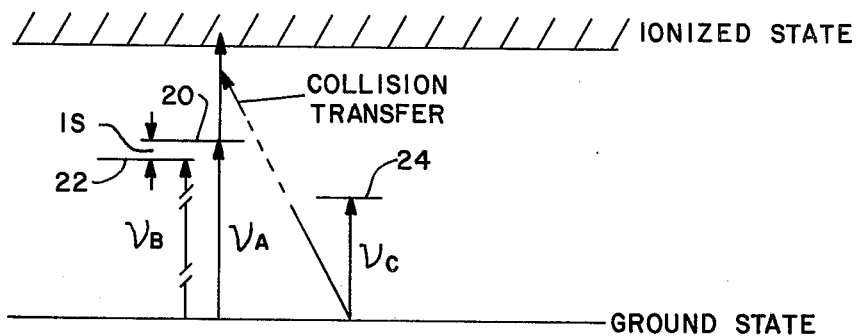
FIG.—1
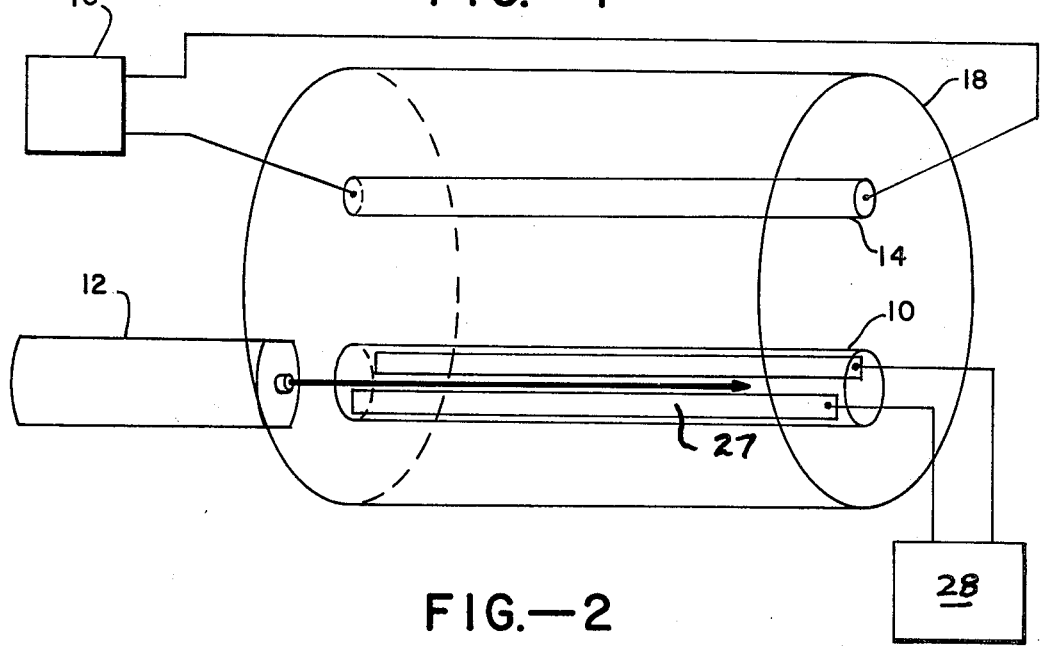
FIG.—2
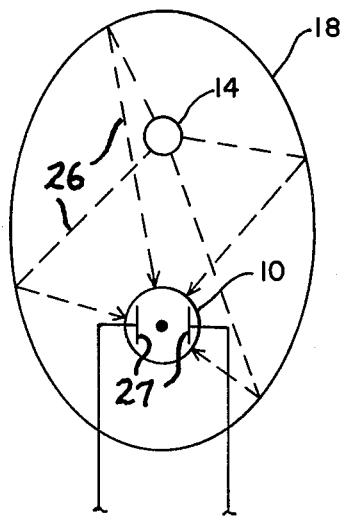
FIG.—3

METHOD AND APPARATUS FOR SEPARATING ISOTOPES

BACKGROUND OF THE INVENTION

This invention relates to the methods and apparatus for the separation of isotopes or other atomic or molecular species which are difficult to separate. Such isotope separation has wide application in the fields of radiation chemistry, in the production of radioactive isotopes, and in the production of nuclear reactor fuels. In the production of nuclear fuels, diffusion and centrifuge processes have long been used, but have been costly to implement. In the production of radioisotopes, particularly those of short lifetime for medical purposes, past processes are often too long compared to useful lifetimes of certain isotopes.

Proposals have been made for other techniques of isotope separation as by the use of lasers. Reference is made to the review article by C. Bradley Moore, "The Application of Lasers to Isotope Separation," in the *Accounts of Chemical Research*, Volume 6, page 223 et seq., published January, 1973, for a review of such techniques. In particular, one technique which has received considerable attention is that described by R. V. Ambartzumian and V. S. Letokhov in *Applied Optics*, Volume 11, page 354, published February, 1972, "Selective Two-Step (STS) Photoionization of Atoms and Photodissociation of Molecules by Laser Radiation," hereinafter referred to as STS. These previously proposed techniques will now be reviewed as applied to the separation of U235 and U238. The STS proposal provides that the U235-U238 mixture would be vaporized and then excited with a tunable laser tuned to the resonant frequency of the ground to excited state transition of the desired isotope species, after which the excited species would be photoionized and separated from the other species. Due to what is called isotopic shift, the resonant frequency of one isotope typically differs from an adjacent isotope by a small fraction of the wave number to many wave numbers. For example, for uranium the U235-U238 isotope shift is about 1.4 wave numbers for the 4244.4 A transition. (H. G. Kuhn, *Atomic Spectra*, 2nd Ed., 1962, Academic Press, Plate 18, opposite page 335.) The U235 can therefore be selectively excited, as by a tuned, narrow band laser, to an excited state, while the other specie, U238, remains in the ground state. The laser power densities which are required for the first step of excitation are quite modest and would typically be in the range of tens of watts/cm$^2$. Of course, the tunable laser required for the STS process must have an output linewidth that is small compared to the isotopic shift. The pressure (i.e., concentration) of the isotope mixture has to be such that exchange collisions do not dominate before the desired isotope is separated out, see the Moore review article referenced above.

In the second step of the previously proposed STS process, the selected and previously excited specie A is photoionized at a second frequency with photons having energy sufficient to photoionize the specie A, but insufficient to photoionize specie B, still in the ground state.

A general and important problem with the STS technique is that the absorption cross section seen by the second photon is typically at least five orders of magnitude smaller than the cross section available to put the desired isotopic specie into the first excited state. Because the absorptive cross section is so much smaller, it is readily shown that, if each previously excited atom is to be ionized, the incident power reflux for the second photon must be increased over that for the first photon in the same ratio that this second cross section is smaller than the first cross section. For example, if the photoionization cross section is five orders of magnitude smaller than is the cross section for excitation to the first state, then five orders of magnitude more power is required in the second photon to photodissociate all of the excited specie. The fact that this greatly increased power density is required leads to an inherently inefficient process. Though the power density need be very high in order to excite all the atoms which are present, there may not be a sufficient number of atoms present to absorb a sufficient number of this incident power to allow a process with reasonable efficiency. The problem is made worse since the isotope pressure, for instance of U235-U238, must be maintained sufficiently low that exchange collisions between an excited and ground state isotopic specie do not occur faster than the desired isotope may be separated out. There is therefore a need for a new and improved method and apparatus for separating isotopes using the principle of selective isotope excitation.

SUMMARY OF THE INVENTION AND OBJECTS

In general it is an object of the present invention to provide a method and apparatus for separating isotopes or other species which will overcome the above limitations and disadvantages.

A further object of the invention is to provide a method and apparatus of the above character in which the cross section or probability of energy transference from the exciting field to a selectively excited one of the species is enhanced by collision transfer from a photo excited third species to thereby increase the efficiency of operation and reduce operating costs.

Another object of the invention is to provide a method and apparatus of the above character in which the radiation field for exciting the third species can be provided by an incoherent radiation source.

The foregoing objects are achieved by employing a method and apparatus in which the species of isotopes A and B to be separated are confined within a given volume and one of them selectively ionized using a combination of selective photoexcitation and collision ionization by a photoexcited species C. Isotopes A and B are characterized by having distinctly excitable absorption states or resonance absorption lines separated by a small amount called an isotopic shift. The lines are sufficiently precise, however, that they can be selectively excited by employing radiation of a suitably narrow band source, such as provided by a laser or other narrow line width source. Accordingly, the species to be separated is excited by a tunable laser while the other species is left essentially unexcited, i.e., at ground state. Species B, may, of course, include multiple unwanted isotopes, such as U234, U236, and UU238. A third species C is introduced into the volume so as to intermingle with species A and B. The third species is selected to have an absorption line C such that the combined energy of A and C is greater than that required to ionize the excited portion of the species A, but not sufficient to ionize species B. A suitable source as, for example, a flash lamp or tunable laser is energized to irradiate the given volume with photons having an energy range encompassing C so that the species C n the volume becomes excited at its resonance line $v_C$. It is found that collision processes cause energy transference from specie C to specie A, specie A being ionized by such energy transference. The cross section in this collision transfer may be much larger than that for direct photon absorption. However, the fact that the absorption line of specie C is less than that which would cause ionization of specie B and also is not coincident with an absorption line of specie B means that specie B will be unaffected by the presence of either of the radiation fields used to excite specie A. Accordingly, specie A becomes ionized and can be separated by any means suitable for separating the ions A from un-ionized specie B, such as an electric field supplied by suitable energized electrodes bounding the given volume.

The invention is thus characterized as providing a catalyst to obtain a significant increase in ionization of the cross section of the species to be separated, which is not consumed, and which serves to greatly enhance the efficiency of the separation process. In this sense, the use of a collision transfer mechanism to obtain ionization as described herein is similar to the use of catalysts in other processes.

These and other features and objects of the invention will become apparent from the following more detailed description when taken in conjunction with the accompanying drawings and claims.

BRIEF DESCRIPTION OF THE DRAWINGS

FIG. 1 is an energy level diagram illustrating the relationship of the absorption emission lines of the various species as employed in the present invention.

FIG. 2 is a schematic drawing illustrating apparatus for carrying out the present invention.

FIG. 3 is an end view of the apparatus of FIG. 2.

DETAILED DESCRIPTION OF THE PREFERRED EMBODIMENTS

Referring now more particularly to the drawings, here is shown in FIG. 2 an apparatus for carrying out the invention and including a suitable transparent tube 10 for containing the species A and species B, each of which is in the gaseous state within a given volume defined by the tube. Generally speaking, species A and species B will have to be at a sufficiently low vapor pressure that isotopic exchange collisions between excited and ground state isotopic species do not occur faster than the desired ionized isotope may be separated.

A suitable tunable photon source such as a laser 12 is provided for irradiating the tube 10 and the species contained therein with a light beam having an output capable of exciting a predetermined absorption line $v_A$ of species A. Examples of suitable tunable lasers include the tunable dye lasers, such as for Example Rhoamine 6G and Coumerin dyes pumped either by CW or pulsed laser sources. Other suitable sources include tunable optical parametric oscillators, or any other precisely tunable photon source.

As used herein, the photoexcitation step as applied to specie A should be understood to include multi-step processes and other excitation procedures which do not directly excite species A to the excited level but which nevertheless cause it to reach that level. For example, the desired level may be reached in two steps in which species A is selectively photoexcited by two or more precisely tuned sources. Alternately, species A may be excited to a selected higher level from which it spontaneously decays to the desired level.

Means are provided for introducing a third species C having an absorption line $v_C$ such that the combined energy $v_A$ plus $v_C$ is greater than that required to ionize the excited portion of the species A but is less than that which would be capable of ionizing species B.

Means is provided for irradiating the species C within the given volume of tube 10 with photons having an energy range coinciding with the transition $v_C$ such that the species C become photoexcited. Such means, for example, can take the form of an incoherent discharge flash lamp 14 also containing species C. Such means could also be any other suitable source having an output which can photoexcite species C within the given volume. As shown in FIG. 2, the flash lamp 14 and the tube 10 are incorporated within a cylindrical reflector 18 of elliptical cross section and located along the axes defined by the geometrical focii of the ellipse so formed.

Referring to the FIG. 1, an energy level diagram is shown which facilitates understanding the present invention. As shown, species A has an excited state indicated at 20 which is separated from similar excited state of species B indicated at 22 by an amount termed the isotope shift, 15. The tunable source emits radiation narrowly confined, for example, about the frequency $v_A$ so as to selectively excite species A without exciting species B. The radiation 26 supplied from the source 14 impinges upon species C and excites the same to a level indicated at 24 which when combined by collision transfer with the energy of the excited species A is sufficient to ionize species A, i.e., to remove an electron and bring species A into the continuum or ionized state.

The ionized species A is easily separated from the un-ionized species B and C as by the application of an electric or magnetic field, such as by incorporating electrodes 27 into the tube 10 and applying an electric field thereacross by a suitable source 28. Once the ionized species B impinge upon the cathode, they become imbedded therein and can be stripped by known techniques. Other techniques may be useful for separating the ionized species A, as by reacting the same with yet a fourth component selected to be preferentially reactable with the ionized species.

The effectiveness of the present invention depends upon the ability to enhance the cross section for ionization in the second step of the selective ionization of species A. However, even if only moderate increases were available, it would still be significant since a reduction by any factor in the power required to obtain isotope separation would decrease the cost of such separation and could be significant, particularly where they are conducted on a large scale, such as with nuclear fuel production.

The following analysis is presented in order to facilitate understanding of the likely improvement which can be obtained utilizing the present invention. The relation for the power density per unit area required for the first photon absorption in both this and the STS process is $$P_1/A = \hbar\omega_1/\sigma_1 T_1$$

where $\omega_1$ is the frequency of the photon in angular units; $\sigma_1$, the cross section; and $T_1$ the time for spontaneous decay of the species from the state to ground. It is also known that the transition probability for the absorption of the second photon into the ionized continuum (as in the STS process) is equal to a similar expression. If the members of species A excited to the first state are to be utilized, the transition probability must be equal to or greater than the inverse of the decay time of that level, typically of the order of $10^{-7}$ seconds. Thus a transition rate of about $10^7$ transitions per second is required in order to have a good probability of taking each excited element of species A into the continuum before it decays to ground. Combining these relations we find that the incident power density of the second photon to that of the power required of the first is in fact the ratio of the cross sections and it is an experimental fact that this is of the order typically of $10^5$ to $10^7$. There is the additional constraint that exchange reactions limit the isotopic pressure. Exchange reactions are collisions of members of species A and species B in which they exchange energy. When this occurs, the selectivity of the overall process is markedly decreased, for the wrong isotope is in the excited state. To prevent this, it is necessary to work at low pressures which, when combined with the limitation of small cross section, may place severe constraints on system design and overall operating efficiency. Accordingly, it is highly desirable that the second cross section for taking the excited species A into the ionized continuum be as large as possible.

In order to assess the likelihood of obtaining a significantly increased cross section using collisions by the third species C, there follows here a brief analysis utilizing sodium atom as an example to see if in assessing one of the possible collision processes a significant increase in cross section takes place. However, it should be understood that while a limited analysis is given here, it is believed that when all of the various collision possibilities are taken into account that a more favorable result may be obtained than that presented. No limitation should be understood to arise from the analysis herein in connection with the sodium atom, that atom being selected primarily because of the readily available spectroscopic data. The criteria for choice of the species C atom is determined by the energy levels which must be reached, as will be more fully explained hereinafter. Accordingly, this analysis is quite restrictive in that it examines a particular type of collision between the additional species C and the desired isotope. This type of collision might be termed as a dipolar collision or a collision employing a van de Waals interaction. The nature of this collision is as follows. The input photon from the lamp 14 excites species C into an excited state. When in the excited state, species C carries a dipolar field. This dipolar field induces a transition of the species A into the continuum. An approximate formula for describing this process is given as equation (2):

$$W(t) = \frac{\pi}{16\tau^2\epsilon_0^2} N_C^* \frac{|\mu_A|^2 |\mu_C|^2}{r_0^3} \rho(\omega) \quad (2)$$

$W(t)$ is the transition probability of specie A.
$N_C^*$ is the species C concentration.
$|\mu_C|$ is the matrix element of the transition of species C.
$|\mu_A|$ is the matrix element to the continuum of the transition of species A.

$\rho(\omega)$ is called the density of states of the A species in the continuum. $r_o$ is the distance of closest approach to which this theory is carried, i.e., minimum interatomic spacing at which the van der Waals interaction potential is valid.

It is convenient to express this transition probability (Equation (2)) in terms of the absorption coefficient of species A. Writing it in this manner has the advantage that the density of states of species A and its matrix element, both of which may be unknown quantities, does not appear explicitly. With it in that manner and substituting a matrix element for $|\mu_A|$ and $|\mu_C|$, both equal to $2 \times 10^{-29}$ Coulomb meters, one finds the following equation (3) which relates the transition probability to the concentration of species C and to the absorption cross section of species A.

$$W_A(t) = (4 \times 10^9) N_C^* \sigma_A \quad (3)$$

A typical decay lifetime is perhaps 100 nanoseconds. To catch the majority of atoms before they are decayed, we require a transition probability of about $10^7$. Substituting $10^7$ into equation (3) assuming a continuum cross section of $10^{-16}$ centimeters$^2$, one finds a required concentration of species C of $2.5 \times 10^{13}$/centimeter. This number turns out to be reasonably low. If it were high it would tend to cause scrambling collisions of various types.

To hold about $10^3$ atoms/cm$^3$ species C (i.e., sodium) atoms in an excited state requires a certain amount of power, and the power density P/A is given by $$N_A^* = \frac{P}{A} \frac{T_1}{L} \frac{1}{\tau\omega} \quad (4)$$

where $N_A^*$ is the density maintained at a given level of incident power, P; $T_1$ is the relaxation time of the excited state; and L is the thickness of species C that the light $v_C$ must traverse. Clearly, on physical reasoning, if the light must go through a longer distance, one requires a higher power to hold the same number of atoms in an excited state. By substituting equation (4) into equation (3) for transition probability, normalizing with respect to the transition probability of the A species, one then can find the ratio of the effective absorptive cross sections of the two species when together, as compared to the absorptive cross section for photoionization of the species A alone, i.e., STS process. That improvement ratio is equal to $$R = \frac{\sigma_A + \pi}{\sigma_A} = \frac{1}{16\epsilon_0^2 \eta} \frac{1}{\tau\omega} \frac{|\mu_C|^2 T_1}{r_0^3 L} \quad (5)$$

where $T_1$ is the relaxation time of the species C (i.e., atomic sodium), which may include radiative trapping. Assuming
$|\mu_C| = 2.5$ Bohr radii
$\omega = 3.2 \times 10^{15}$ radians/sec (5895A Na Transition)
$T_1 = 20 \times 10^{-9}$ seconds
$L = 3$ mm
$\eta = 377$ ohms
one finds the normalized enhancements for one collision mechanism when following the present invention is $R \approx 81.5$. By working at a sodium concentration of about $10^{15}$ atoms/cm$^3$, radiative trapping will cause $T_1$ to increase to about 2 microseconds. In this case, the improvement ratio R will be increased to about $10^4$.

Up to now the ionized continuum has been described as being a level above which any point is equivalent in the sense that the energy required of specie C need only be greater than asserted energy to get into the continuum. This is accurate only as a first approximation in that once the continuum is reached, there are certain exceptions to such equivalency known as autoionizing levels. An autoionizing level is a particular region or level in the continuum where the absorption cross section is greater than surrounding absorption cross sections. It will be found useful to use such autoionizing levels whenever present to enhance the cross sections for collision ionization, as described herein.

While there has been disclosed herein a process for direct excitation of a given level of an atomic species, it should be understood that there is likely to arise many systems which possess a dominant decay scheme such that it would be convenient to excite the atomic or molecular species A to a higher level from which there is decay to another lower level. Such processes are sometimes characterized as cascade processes. In utilizing such a system the present invention would contemplate the first irradiation to be of such a character as to substantially excite one or more levels from which a cascade decay to a lower level takes place. Subsequently, collision transfer as set forth herein is employed to obtain ionization of species A. Another procedure uses more than one tunable laser so as to enable the selective excitation of species A to a first excitation level while leaving species B unexcited and then subsequent excitation to one or more levels having a well-defined relationship from the first level. In this way, it is possible to stepwise elevate the species A to a particular desired excitation level with respect to the ionized continuum and thus control the type, amount, and character of the energy required and species which should be used to collision ionize species A by collision transfer.

In many circumstances it will be desired to operate the species C at a high enough pressure, i.e., density, that significant radiation trapping effect can occur. By radiation trapping is meant the process in which radiation once captured by species C and re-emitted is recaptured many times within the given volume. This has the effect of increasing the significant lifetime of captured radiation by species C by a factor which can be as high as two orders of magnitude. If, for example, the absorption cell has an effective thickness many times the absorption depth of the radiation used to excite species C, then that effect of radiation trapping is to greatly increase the effective lifetime of the species C. This enables the excited species C to have many times more collision opportunities and therefore to increase its effectiveness by the same factor. Such an improvement in effective lifetime of the collision species C has a direct effect on the enhancement achieved by use of the present invention.

By way of explanation, the excitation of species C has been set forth herein as taking place at the frequency of its absorption line. However, this may not always be desirable. Assume a significant concentration of species C within a given volume. The effective decay lifetime of such a concentration is strongly influenced by multiple reabsorption between the members of species C known as radiative trapping. However, by providing such a concentration the absorption length for absorbing all of the incident radiation may become so short as to be undesirable. A solution is to detune the excitation frequency by a fraction of a wave number so as to make the absorption length commensurate with the size of the volume desired to be irradiated. This will cause a more uniform distribution of radiation throughout a given volume and will not affect the collision transference process.

Alternately, it may be desirable to excite species C by a cascade process. As an example, the previously described 5895A transition (3p-3s) of Na may alternately be excited by any set of transitions that populate the Na 4s level which then cascades to the 3p level (4s - 3p transition).

The following sets forth an example in order to clarify the application of the present invention to U235, U238. Referring to the aforereferenced text by Kuhn, there is an absorption line of the uranium at 4244.4 A which can be excited by a tunable laser capable of tuning over a very narrow range, centered at this wave number. Such a laser could be a coumarin or a dye laser pumped by either a nitrogen laser, a flash lamp, or cw argon laser. The uranium ionization potential is 6.08 electron volts. This means that a photon which has an energy greater than 3944 A is needed for ionization of an excited U235 atom from the 4244.4 level. That requirement nearly rules out Periodic Table column 1 species. In column 2 the elements with the greatest vapor pressure and the strongest transitions above the 3944 A region are cadmium and mercury. Of these, cadmium appears appropriate due to its resonance line at 2288 angstroms and its metastable line at 3261 angstroms. Mercury could also be used at its line at 2537 angstroms or other resonance line at 1845 angstroms.

In practice, one need not measure or rely on the measured absolute values of the positions of isotope shifts or levels being used in any given separation. For example, in the separation of U235 to U238 one would prepare a pure sample of the U235, the desired isotope. One then would irradiate the isotope from a tunable laser and sweep across a range of frequencies until the expected fluorescence of the pure sample occurs. That identifies one of its characteristic photoexcitation levels. It may be desirable to then stabilize the photoexcitation source by reference to the fluorescence of a pure sample to assure that the source remains on the frequency of the isotope desired. This is straightforward by sampling the source output and fluorescence which can then be used with a servo loop to control the exact frequency of the source. Thus while certain designated numbers have been given heretofore by way of example in connection with the separation of U235 from U238, such exact spectroscopy of a system need not be exactly known in order to practice the present invention.

As disclosed herein, it is contemplated that the present invention could be carried out utilizing tunable lasers, examples of such lasers being disclosed. However, the efficiency with which such lasers operate will determine whether it is practical to utilize lasers as distinguished from other sources of monochromatic radiation. It should be noted that the only requirement on either of the radiation sources used in the practice of the present invention is that they be tunable and that they have a narrow band width output. It will be noted that no coherence requirement is placed upon the irradiating fields and that the use of lasers is suggested and disclosed herein primarily because of the ability to obtain extremely narrow and well defined band widths.

Thus, there has been provided a new and improved method and apparatus for the separation of isotopes in which the cross section for the ionization step is greatly enhanced. While there has been disclosed herein a specific example relating to a description of the preferred embodiments, it should be understood that many modifications and adaptations of the technique can be incorporated therein without departing from the spirit and scope of the invention. Among those mentioned include the use of chemical means, for example, to selectively react with the ionized species to facilitate separation, the use of detuned photo excitation frequencies from any suitable source for the irradiation of species C. In addition, it should be noted that the irradiating fields can be aligned in any direction with respect to each other, the specific relationship between the radiating fields as shown in the drawing not being critical. In fact, it may be even desirable to have opposing laser beams in order to overcome a limitation involving the Doppler effect in connection with isotopes having absorption lines within the Doppler band width.

Furthermore, the discussion illustration herein with respect to the utilization of particular radiation frequencies in the irradiation of atoms should not be taken as a limitation on the invention. For molecular separations are also possible utilizing the present invention. For example, $U(235)F_6$ could be separated from $U(238)F_6$ utilizing transitions occurring in the infra-red region of the spectrum, i.e., in the range from 2 to 20 microns. Such molecular separations although occurring at different frequency due to the difference in absorption transition location are nevertheless entirely analogous to the atomic illustration given herein. Furthermore, separations between species which are not isotopically related can also be carried out utilizing the present invention.

Thus, the present invention finds a wide variety of applications in the field of separation of isotopes and other species. It is believed that the time required to effect such separations will thereby be materially shortened and therefore that the production of radioactive isotopes having lifetimes which are too short to be useful when separated by more time-consuming techniques can now be obtained and utilized, particularly for medical purposes. And the possibility of large scale production of U235 uranium 235 utilizing the present technique is evident. Accordingly, the scope of the invention should be taken broadly, commensurate with the scope of the accompanying claims as interpreted by the reference to the specification.

I claim:

1. In a method for the separation of isotopic species A and B having distinctly excitable absorption states at different frequencies $v_A$ and $v_B$ said species being contained within a given volume, the steps of irradiating said volume with photons having a narrow energy range sufficient to selectively excite isotope species A into a desired absorption state without exciting species B, adding a third species C having an absorption line $v_C$ such that the combined energy $v_A + v_C$ is greater than that required to ionize the excited species A, said $v_C$ being of lower energy than that which would ionize species B, said species C having a greater cross section for absorption of photons $v_C$ and subsequent ionization of species A by collision than the cross section of species A for photoionization from said excited state, irradiating said volume with photons having an energy range coupling to the absorption line of species C such that species C becomes photo-excited and transfers energy to species A by collision to thereby selectively ionize the species A, separating the ionized species A from species from un-ionized species B and C.

2. A method as in claim 1 in which said absorption state of species A is reached by a selective multi-step excitation.

3. A method as in claim 1 in which said absorption state of species A is reached by photo excitation of a higher level from which cascade decay to said absorption level occurs.

4. A method as in claim 1 in which said absorption state of species C is reached by a selective multi-step excitation.

5. A method as in claim 1 in which said absorption state of species C is reached by photo excitation of a higher level from which cascade decay to said absorption level occurs.

6. A method as in claim 1 in which said species A is the isotope $U^{235}$ and species B are other isotopes of uranium.

7. A method as in claim 6 in which species C is mercury and said step of irradiating species C is carried out using a mercury discharge lamp.

8. A method as in claim 6 in which species C is cadmium and said step of irradiating species C is carried out using a cadmium discharge lamp.

9. A method as in claim 1 in which said species A and B are molecules.

10. A method as in claim 1 in which said species A and B are atoms.

11. A method as in claim 1 in which said irradiation step of species C is carried out using a low pressure discharge lamp containing species C.

12. A method as in claim 1 in which species A and B are isotopes characterized by having a resonance absorption line separated by an isotope shift, said selective irradiation of species A being carried out by tuning a narrow band source to the resonance absorption line of species A.

13. A method as in claim 1 further including the step of maintaining the density level of species C at a high enough level to obtain significant radiation trapping.

14. A method as in claim 13 further including the steps of detuning the radiation used to excite species C from the exact absorption resonance a small amount so that the absorption depth of the contained species C within said given volume approximates the effective size of the said given volume.

15. In apparatus for the separation of species A from species B, each of said species being in a gaseous state and distributed in a given volume, said species having distinctly excitable absorption states at different frequencies $v_A$ and $v_B$, means for irradiating said volume with photons having an energy sufficient to selectively excite species A into a desired absorption state without exciting species B, a means for introducing a third species C having an absorption line $v_C$ such that the combined energy $v_A + v_C$ is greater than that required to ionize the excited portion of the said species A, said absorption line being less energy than that which would ionize species B, said species C having a greater cross section for absorption of photons $v_C$ and subsequent ionization of species A by collision than the cross section of species A for photoionization from said excited state, means for irradiating species C with protons having an energy range encompassing $v_C$ such that species C becomes excited and transfers energy to species A by collision to thereby selectively ionize species A, means separating the ionized species A from the un-ionized species B and C.

16. In a method for the separation of isotopic species A and B having distinctly excitable absorption states at different frequencies $v_A$ and $v_B$ said species being contained within a given volume including the steps of irradiating said volume with protons having a narrow energy range sufficient to selectively excite isotope species A into a desired absorption state without exciting species B, ionizing said excited species A, and separating the ionized species A from the un-ionized species present, the improvement comprising the steps of adding a third species C having an absorption line $v_C$ such that the combined energy $v_A + v_C$ is greater than that required to ionize the excited species A, said $v_C$ being of lower energy than that which would ionize species B, said species C having a greater cross section for absorption of photons $v_C$ and subsequent ionization of species A by collision than the cross section of species A for photoionization from said excited state, and irradiating said volume with photons having an energy range coupling to the absorption line of species C such that species C becomes photo excited and transfers energy to species A by collision to thereby selectively ionize said species A.

17. In a method for the separation of isotopic species A and B having distinctly excitable absorption states at different frequencies $v_A$ and $v_B$ said species being contained within a given volume and including the steps of irradiating the volume with photons having a narrow energy range sufficient to selectively excite isotope species A into a desired absorption state without exciting species B, ionizing said excited species A and separating the ionized species A from the un-ionized species present, the improvement comprising adding a third species C to said given volume, said species C having an absorption line $v_C$ such that the combined energy $v_A + v_C$ is greater than that required to ionize the excited species A, said $v_C$ being of lower energy than that which would ionize species B, optically photo exciting species C so that collisions of excited species C with excited species A cause transfer of energy and selective ionization of species A.

18. A method for selectively ionizing an isotope A in the presence of a mixture of isotope A with one or more isotopes B in which isotope A is selectively excitable to an atomic or molecular absorption level while said isotopes B remain unexcited, the improvement comprising adding a species C characterized by having a greater cross section for absorption of photons $v_C$ and subsequent ionization of species A by collision than the cross section of species A for photoionization, said species C having an absorption line $v_C$ such that the combined energy $v_A + v_C$ is greater than that required to ionize the excited species A, said $v_C$ being of lower energy than that which would ionize species B, and further including the step of optically exciting species C such that ionization of species A from said atomic or molecular level proceed by collision transfer of energy from said optically excited species C.

* * * * *